(12) United States Patent
Antony et al.

(10) Patent No.: US 10,877,677 B2
(45) Date of Patent: *Dec. 29, 2020

(54) STORAGE TIERING BASED ON VIRTUAL MACHINE OPERATIONS AND VIRTUAL VOLUME TYPE

(71) Applicant: VMWARE, INC., Palo Alto, CA (US)

(72) Inventors: Jinto Antony, Bangalore (IN); Nagendra Singh Tomar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/334,148

(22) Filed: Oct. 25, 2016

(65) Prior Publication Data
US 2017/0046091 A1    Feb. 16, 2017

Related U.S. Application Data

(63) Continuation of application No. 14/534,227, filed on Nov. 6, 2014, now Pat. No. 9,477,427.

(30) Foreign Application Priority Data

Sep. 19, 2014    (IN) .......................... 4569/CHE/2014

(51) Int. Cl.
*G06F 3/06*    (2006.01)
*G06F 9/455*    (2018.01)
(Continued)

(52) U.S. Cl.
CPC .......... *G06F 3/0635* (2013.01); *G06F 3/0604* (2013.01); *G06F 3/0644* (2013.01);
(Continued)

(58) Field of Classification Search
CPC ......... G06F 2009/45579; G06F 3/0604; G06F 3/0659; G06F 3/0683; G06F 9/45558;
(Continued)

(56) References Cited

U.S. PATENT DOCUMENTS 8,239,584 B1 *    8/2012    Rabe ...................... G06F 3/0605
                                                                        710/8
8,555,018 B1 *    10/2013    Rohr ...................... G06F 3/0605
                                                                        707/758
(Continued)

OTHER PUBLICATIONS

John Webster, Technology Insight Series: Automated Tiered Storage for VMware, Evaluator Group, 2011, pp. 1-5.
(Continued)

*Primary Examiner* — Jorge A Chu Joy-Davila
(74) *Attorney, Agent, or Firm* — Fish & Richardson P.C.

(57) ABSTRACT

To optimize front-end operations performed on virtual machines, a storage tiering module preemptively guides the placement of virtual volumes in storage tiers within a storage system. Upon detecting a front-end operation request, the storage tiering module identifies a storage requirement, such as an expected provisioning activity level during the front-end operation. Based on the identified storage requirement, the storage tiering module selects an appropriate storage tier. Subsequently, in preparation for the front-end operation, the storage tiering module places the virtual volume at the selected storage tier. Because the storage tiering module places the virtual volume in a tier that reflects the resource consumption expected during the front-end operation, the storage system does not incur the performance degradation that often precedes tier movement in conventional, reactive approaches to storage tiering.

17 Claims, 4 Drawing Sheets

(51) Int. Cl.
*G06F 16/188* (2019.01)
*G06F 16/185* (2019.01)

(52) U.S. Cl.
CPC .......... *G06F 3/0647* (2013.01); *G06F 3/0659* (2013.01); *G06F 3/0665* (2013.01); *G06F 3/0683* (2013.01); *G06F 9/45558* (2013.01); *G06F 16/185* (2019.01); *G06F 16/192* (2019.01); *G06F 2009/45579* (2013.01); *G06F 2009/45583* (2013.01)

(58) Field of Classification Search
CPC .......... G06F 17/30; G06F 2009/45583; G06F 3/0635; G06F 3/0644; G06F 3/0647; G06F 3/0665
See application file for complete search history.

(56) References Cited

U.S. PATENT DOCUMENTS

| | | | |
|---|---|---|---|
| 8,838,887 B1 | 9/2014 | Burke et al. | |
| 8,863,124 B1* | 10/2014 | Aron | G06F 9/45533 709/223 |
| 8,898,402 B1* | 11/2014 | Stronge | G06F 3/0605 711/100 |
| 8,954,381 B1* | 2/2015 | Naamad | G06F 3/0685 707/609 |
| 9,047,017 B1* | 6/2015 | Dolan | G06F 3/0653 |
| 9,229,870 B1* | 1/2016 | Kumar | G06F 12/0868 |
| 9,323,682 B1* | 4/2016 | Marshak | G06F 12/0868 |
| 9,817,766 B1* | 11/2017 | Si | G06F 3/061 |
| 2006/0069862 A1 | 3/2006 | Kano | |
| 2008/0177948 A1* | 7/2008 | Mimatsu | G06F 17/30079 711/117 |
| 2010/0199036 A1* | 8/2010 | Siewert | G06F 3/0613 711/112 |
| 2011/0202705 A1 | 8/2011 | Hayashi et al. | |
| 2011/0289287 A1 | 11/2011 | Yamamoto et al. | |
| 2012/0131302 A1* | 5/2012 | Nasu | G06F 3/0604 711/171 |
| 2013/0097377 A1* | 4/2013 | Satoyama | G06F 3/0605 711/114 |
| 2013/0145095 A1* | 6/2013 | McKean | G06F 16/24552 711/122 |
| 2013/0159359 A1* | 6/2013 | Kumar | G06F 3/0605 707/822 |
| 2013/0219136 A1 | 8/2013 | Nakamura et al. | |
| 2013/0238575 A1* | 9/2013 | Amarendran | G06F 17/30289 707/694 |
| 2013/0326159 A1* | 12/2013 | Vijayan | G06F 3/0644 711/148 |
| 2014/0281306 A1* | 9/2014 | Nakajima | G06F 3/0647 711/162 |
| 2015/0234671 A1* | 8/2015 | Tomita | G06F 9/45558 718/1 |
| 2016/0041789 A1* | 2/2016 | Mills | G06F 3/0674 711/111 |
| 2016/0301960 A1* | 10/2016 | Sze | H04N 21/222 |

OTHER PUBLICATIONS

Non Final Office Action from U.S. Appl. No. 14/534,227 dated Mar. 11, 2016, 22 pages.
Notice of Allowance from U.S. Appl. No. 14/534,227 dated Jul. 15, 2016, 15 pages.

\* cited by examiner

STORAGE TIERING BASED ON VIRTUAL MACHINE OPERATIONS AND VIRTUAL VOLUME TYPE

RELATED APPLICATION

This application is a continuation of U.S. patent application Ser. No. 14/534,227, filed Nov. 6, 2014, now U.S. Pat. No. 9,477,427, which claims the benefit under 35 U.S.C. 119(a)-(d) to Foreign application Serial No. 4569/CHE/2014 filed in India entitled "STORAGE TIERING BASED ON VIRTUAL MACHINE OPERATIONS AND VIRTUAL VOLUME TYPE", filed on Sep. 19, 2014, by VMware, Inc., which is herein incorporated in its entirety by reference for all purposes.

BACKGROUND

Virtual machines (VMs) running in computer systems may access memory resources encapsulated within virtual volumes (VVOLs) that are managed and exported by a tiered storage system. VVOLs are VM-centric logical aggregations of physical storage units included in the tiered storage system. Detailed descriptions of VVOLs are set forth in U.S. patent application Ser. No. 13/219,358, filed Aug. 26, 2011 and entitled "Object Storage System," the entire contents of which are incorporated by reference herein. To optimally utilize the available physical storage units, each VVOL may be assigned to a different "storage tier," where each storage tier includes types of physical storage units with distinct performance characteristics. For example, each storage tier may represent a different type of drive, SSD, SAS, SATA, SCSI, rotational speed, and/or RAID level.

In an attempt to increase the performance of the computer system, some tiered storage systems observe the input/output performance of the physical storage units and transparently move data from one storage tier to another storage tier in a process known as "auto-tiering." In such a tiered storage system, if the tiered storage system observes increased I/O activity involving a particular logical storage volume, then the tiered storage system may promote the logical storage volume to a higher performance tier. While such a reactive auto-tiering algorithm may improve performance in non-virtualized environments, past I/O activity is not typically a good indication of future I/O activity across the VVOL life cycle and, consequently, the reactive auto-tiering algorithm may not be effective in virtualized environments.

More specifically, during the VVOL life cycle, different VM operations typically generate numerous I/O operations for a relatively short period of time and then the number of I/O operations drops dramatically. For example, when a VM is suspended there will be a high number of I/O operations associated with copying the memory to the disk. If a storage tiering system with a reactive auto-tiering algorithm observes the high number of I/O operations, then the storage tiering system may move the VVOL corresponding to the VM to a storage tier with high I/O performance. However, after the suspend operation is completed, the suspended VM will not perform any I/O operations on the VVOL, and the high performance physical memory resources will be wasted. Further, if the time required to move the VVOL exceeds the time required to perform the suspend operation, then performing the tier movement operation reduces the overall performance of the computer system. Consequently, there is a need for an improved storage tiering mechanism in virtualized environments.

DETAILED DESCRIPTION

Figure 1:
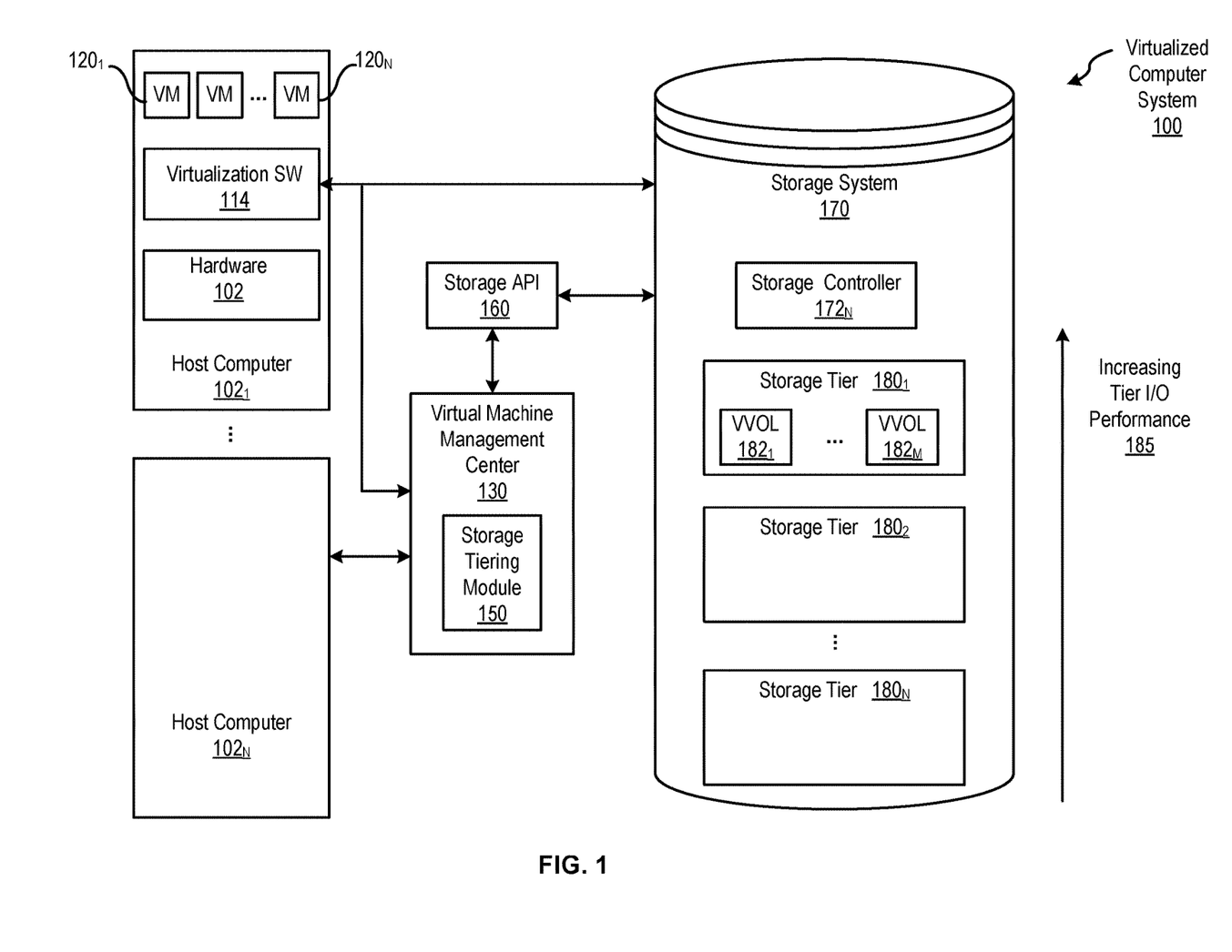
FIG. 1 illustrates components of a virtualized computer system that is configured to implement tiered storage.

FIG. 1 is a block diagram of a virtualized computer system 100 that is configured to implement tiered storage. In the embodiments of the present invention virtual machines (VMs) 120 are instantiated on host computers 102, each of which includes virtualization software 114 and hardware 102, is controlled by a virtual machine management center 130, and is coupled to a shared persistent tiered storage system 170 via virtual machine management center 130. Virtualized computer system 100 may include any number and combination of host computers 102, VMs 120, and storage systems 170. In alternate embodiments, storage system 170 may be replaced by any storage system that enables shared persistent tiered storage.

One example of virtualization software 114 that may be used is included as a component of VMware's vSphere® product, which is commercially available from VMware, Inc. of Palo Alto, Calif. However, it should be recognized that the various terms, layers and categorizations used to describe the virtualization components in FIG. 1 may be referred to differently without departing from their functionality or the spirit or scope of the invention. It should further be recognized that other virtualized computer systems are contemplated, such as hosted virtual machine systems, where the hypervisor is implemented in conjunction with a host operating system.

A storage API 160 provides an interface between virtual machine management center 130 and storage system 170. One exemplary storage API 160 is VMware vSphere® API for Storage Awareness. In alternate embodiments, storage API 160 may be eliminated and virtual machine management center 130 may interface directly with storage system 170. In some embodiments, storage system 170 provides an auto-tiering mechanism and storage API 160 provides an interface that enables virtual machine management center 130 to disable this auto-tiering mechanism. Disabling this auto-tiering mechanism allows virtual machine management center 130 to provide data movement guidance without contradiction from the auto-tiering mechanism. Notably, storage API 160 offloads specific storage operations from virtual machine management center 130 to a storage controller 172 included in storage system 170 to improve performance and efficiency of virtualized computer system 100.

Among other things, storage API 160 and storage controller 172 expose virtual volumes (VVOLs) 182 to connected components of virtualized computer system 100. Applications (e.g., VMs 120 accessing their virtual disks, etc.) running in virtualized computer systems 100 create and access VVOLs 182 on demand. In general, each VVOL 182 contains data associated with a single VM 120. However, each VM 120 may segregate different types of VM data based on I/O requirements and create different VVOLs 182 for each type of VM data. Further, VVOLs 182 may be dynamically created based on the requirements of VMs 120. For example, a VM suspend VVOL may be created during a VM suspend operation. The different types of VVOLs 182 may be chosen in any technically feasible fashion. In some embodiments, different VVOLs 182 may include, without limitation:

VM disk 1 VVOL,
VM disk n VVOL
VM logs VVOL
VM snapshot VVOL
VM suspend VVOL
VM memory swap VVOL
VM metadata VVOL
VM base disk VVOL Upon request of virtualized computer system 100 (e.g., virtual machine management center 130), storage controller 172 creates VVOLs 182 from logical "storage volumes" which represent a logical aggregation of physical storage units. In general, a storage volume may span more than one storage system (e.g. storage system 170) and many storage volumes may be created by a single storage system manager, such as storage controller 172, or a distributed storage system manager. Similarly, a single storage system may contain many storage volumes. It should be recognized that, because a storage volume can span more than one storage system, a storage system administrator can provision to its customers a storage capacity that exceeds the storage capacity of any one storage system. It should be further recognized that, because multiple storage volumes can be created within a single storage system, the storage system administrator can provision storage to multiple customers using a single storage system.

As shown as a conceptual representation in FIG. 1, storage system 170 includes multiple storage tiers 180. Each storage tier 180 has a limited capacity and is associated with specific performance characteristics. In some embodiments, each storage tier 180 may represent a different type of drive, SSD, SAS, SATA, SCSI, rotational speed, RAID level, and so forth. In FIG. 1, storage tiers 180 are depicted in increasing tier input/output (I/O) performance 185, with the topmost storage tier $180_1$ providing the highest I/O performance. Since the performance characteristics of storage tiers 180 varies, the assignment of VVOLs 182 to storage tiers 180 may dramatically impact the performance of virtualized computer system 100, including applications running on VMs 120.

Notably, the access pattern to VVOLs 182 may change over time, typically reflecting front-end operations being performed on VM 120, the state of VM 120 (e.g., suspended or active), and the type of data contained within VVOL 182.

As used herein, "front-end operation" is any operation performed by virtual machine management center 130 or any component of host computer 102 on VM 120. By contrast, "back-end operation," as used herein, refers to any operation performed on VVOLs 182 by storage API 160 or storage system 170. In general, both front-end and back-end operations may affect any number of VVOLs 182. Further, as part of satisfying front-end operation requests, any number of additional front-end and/or back-end operation requests may be generated. For instance, as part of satisfying a front-end operation request to perform a VM snapshot, components within virtual machine management center 130 may generate back-end operation requests to create, move, and/or copy VVOLs 182.

In general, both front-end and back-end operations may affect any number of VVOLs 182 and, consequently, impact storage access patterns to VVOLS 182. For example, the following type of front-end, provisioning operations are usually accompanied by significant changes in storage access patterns:

Power-on VM
Power-off VM
VM suspend
VM resume
VM snapshot
VM removed from network
VM having no network activity
Clone VM without enhanced storage system support for VVOL tier move
Clone VM with enhanced storage system support for VVOL tier move
VM OS crash or hung state
Linked clone creation of VM
Storage vMotion For this reason, embodiments provide a storage tiering module 150 that is configured to coordinate with storage system 170 to move VVOLs 182 between storage tiers 180 as part of such front-end operations. In general, storage tiering module 150 exploits knowledge of the life cycle of VMs 120 to select effective storage tiers 180 for each type of VVOL 182 at each stage of the front-end operation on the VM 120. By contrast, in some conventional storage systems, auto-tiering algorithms move VVOLs 182 between storage tiers 180 in reaction to monitored information, such as increased I/O volume—without considering the life cycle of VMs 120.

Notably, as part of managing VM 120, virtual machine management center 130 routes front-end operation requests to storage tiering module 150. Virtual machine management center 130 may receive explicit front-end operation requests from VM 120 to perform front-end operations (e.g., a user request to clone VM 120) or virtual machine management center 130 may generate implicit front-end operations requests based on VM 120 states (e.g., a hung state). After receiving a front-end operation request, storage tiering module 150 coordinates with storage system 170 to optimize initial placement of VVOLs in storage tiers 182, movement of VVOLs 182 between storage tiers 180 during the front-end operation, and final placement of VVOLs 182 in destination storage tiers 180.

Figure 2A:
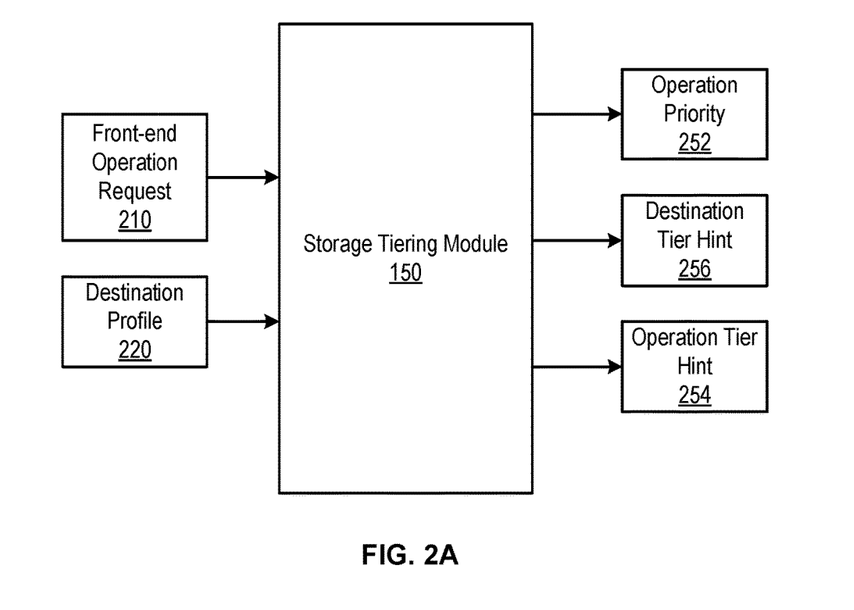
FIG. 2A is a conceptual diagram that illustrates inputs to storage tiering module and the resulting outputs.

FIG. 2A is a conceptual diagram that illustrates inputs to storage tiering module 150 and the resulting outputs. As shown, inputs to storage tiering module 150 include, without limitation, a front-end operation request 210 and a destination profile 220. In general, destination profile 220 defines requested capabilities that guide the creation and/or movement of new VVOLs 182. For instance, storage tiering module 150 may select physical storage units to include in new VVOL 182 based on storage capacity information included in destination profile 220. Outputs of storage tiering module 150 guide the placement of VVOLs 182 in storage tiers 180 and include operation priority 252, operation tier hint 254, and destination tier hint 256.

In general, storage tiering module 150 applies knowledge of the life cycle of VM 120, properties of VM 120, and destination profile 220 to provide placement guidance to storage system 170. In particular, storage tiering module 150 computes one more operation tier hints 254 that guide placement of different VVOLs 182 associated with VM throughout front-end operations. For example, since a front-end operation "power-off VM" is accompanied by a relatively high level of I/O activity associated with VVOL 182 "VM memory swap VVOL," storage tiering module 150 generates operating tier hint 254 to situate VVOL 182 "VM memory swap VVOL" in a relatively high I/O storage tier 182 during the front-end operation "VM power-off." As used herein, "situating VVOL 182 in storage tier 180," includes any guidance and/or requests that involve initially placing VVOL 182 in storage tier 180, moving VVOL 182 to storage tier 180, or copying data from VVOL 182 to storage tier 180. In some embodiments, storage tiering module 150 supports additional data to influence placement in storage tiers 182 via operation priorities 252 that convey relative priorities of operation tier hints 254. Storage tiering module 150 may generate operation priorities 252 in any technically feasible fashion, such as relaying user-specified preferences.

The heuristics that storage tiering module 150 implement to compute operation tier hints 254 may be based on dynamically changing characteristics of VM 120. For example, during a front-end operation "clone VM," storage tiering module 150 may consider the number of linked clones that are powered-on when determining optimal VVOL 182 "base VVOL" placement in storage tiers 180. In one embodiment, storage tiering module 150 implements the following heuristic when processing front-end operation 201 "VM clone:"

| Number linked clones | Optimal placement base VVOL |
| --- | --- |
| 1-10 | Storage tier 5 |
| 10-100 | Storage tier 4 |
| 100-1000 | Storage tier 3 |
| 1000-4000 | Storage tier 2 |
| 4000+ | Storage tier 1 (highest I/O performance) |

Storage tiering module 150 also computes one or more destination tier hints 256 that guide placement of different VVOLs 182 associated with VM 120 after storage system 170 has finished implementing the front-end operation corresponding to front-end operation request 210. Storage tiering module 150 may determine destination tier hints 256 based on heuristics specific to the requested front-end operation or on parameters included in front-end operation request 210 and/or destination profile 220. For instance, after storage system 170 has finished implementing front-end operation "power-off VM," storage tiering module 150 generates destination tier hints 256 to situate VVOLs 182 associated with VM 120 in the lowest performance storage tier 182. In some embodiments, destination profile 220 enables users to assign VVOLs 182 to specific destination tiers based on the type of VVOL 182. In such embodiments, storage tiering module 150 considers destination profile 220 when generating destination tier hints 256.

It should be recognized that providing placement guidance instead of placement requirements enables storage array 170 to consider the guidance in conjunction with knowledge of storage array 170, such as how much storage is available for the various storage tiers 180. In this fashion, storage array 170 may deviate from the placement guidance to optimize placements of VVOLs 192 in storage tiers 182. In alternate embodiments, storage tiering module 150 may select storage tiers 180 and provide placement guidance to storage system 170 in any technically feasible fashion. Further, in some embodiments, storage tiering module 150 may direct storage system 170 to place VVOL 182 in storage tier 182 without considering any alternative storage tiers 182—the "hint" becomes a "request."

In general, storage tiering module 150 is configured to leverage capabilities of storage system 170 to efficiently place VVOLs 182 in storage tiers 180. For example, if storage system 170 provides support for transparent back-end operation requests that move VVOLs 182 between storage tiers 180, then storage tiering module 150 exploits this feature. If storage system 170 does not provide support for transparent back-end operation requests that move VVOLs 182, then storage tiering module 150 issues front-end operation requests that create a new VVOL 182 at the targeted storage tier 182 and then copy the data in the original VVOL 182 to the new VVOL 182.

The described embodiments are to be considered as illustrative and not restrictive, and the techniques described herein may be modified to accommodate differences in the capabilities of components included in virtualized computer system 100. For example, embodiments of storage systems that support placement of different data included in a single VVOL in different storage tiers are envisioned. In such a scenario, the techniques described herein may be modified to optimize placement of different data within the same VVOL in different storage tiers.

Figure 2B:
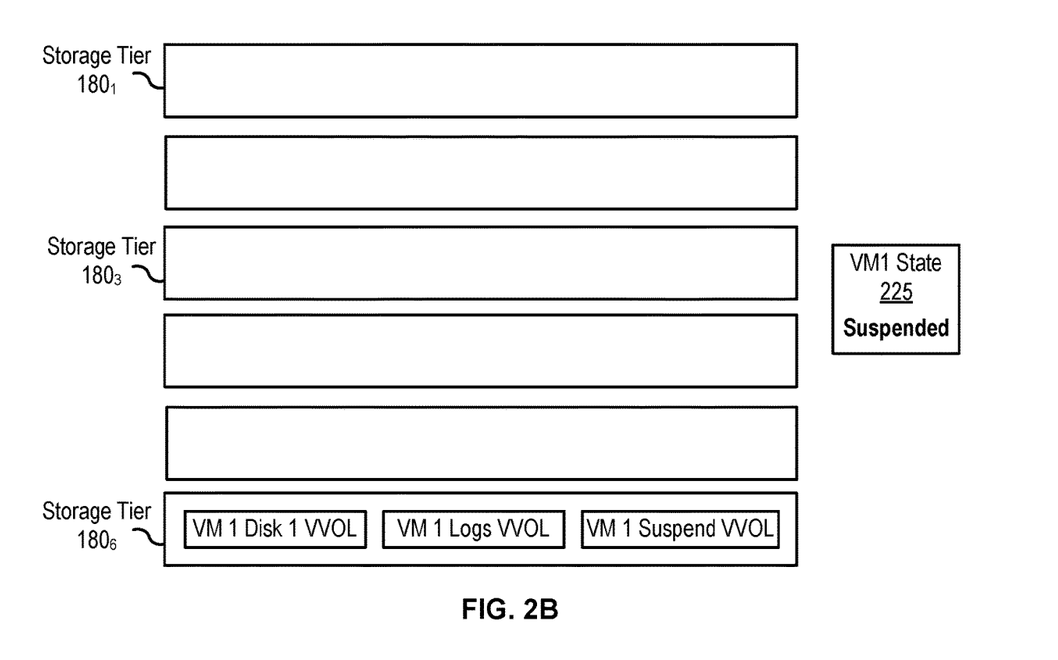
FIG. 2B is a conceptual diagram that illustrates where storage tiering module places virtual volumes in tiered storage system while the corresponding virtual machine is suspended.

FIG. 2B is a conceptual diagram that illustrates where storage tiering module 150 places virtual volumes 182 in tiered storage system 170 while the corresponding virtual machine 120 is suspended. As shown, storage system 170 includes six storage tiers $180_1$-$180_6$ Storage tier $180_1$ includes physical memory devices with the highest I/O performance and storage tier $180_6$ includes physical memory devices with the lowest I/O performance. A VM 120 "VM1" is in a VM1 state 225 "suspended," and VVOLs 182 associated with VM 120 "VM1" are shown in storage tiers 180. Since VM 120 is not involved in I/O operations while suspended, storage tiering module 150 assigns "VM1 disk 1 VVOL," VM1 logs VVOL," and "VM1 suspend VVOL" to storage tier $180_6$, thereby freeing capacity at higher performance storage tiers 180 for more active VVOLs 180.

Figure 3A:
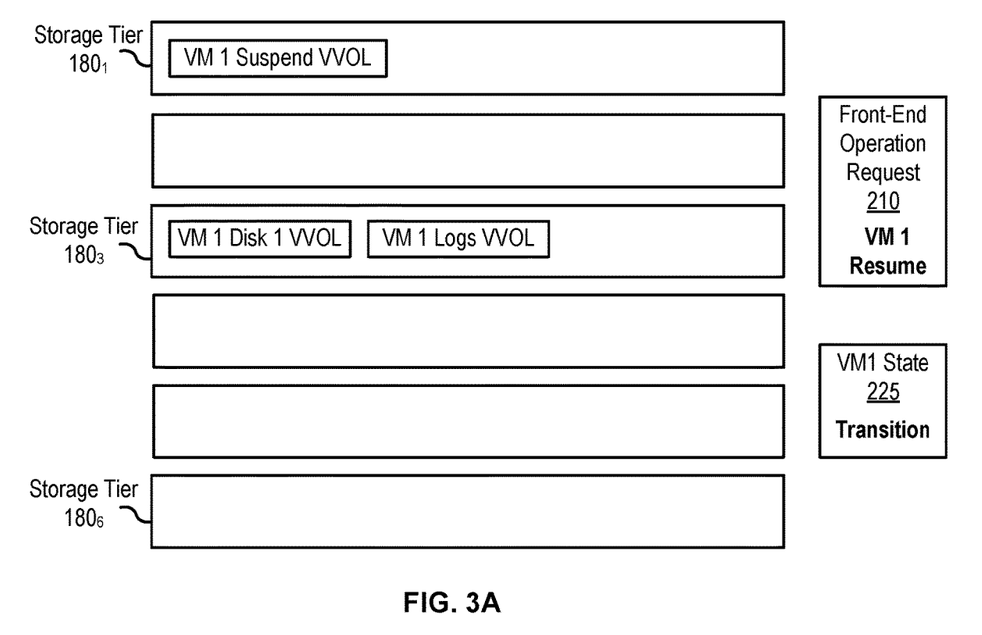
FIG. 3A is a conceptual diagram that illustrates where storage tiering module places virtual volumes in tiered storage system while a resume operation is performed on the corresponding virtual machine.

FIG. 3A is a conceptual diagram that illustrates where storage tiering module 150 places virtual volumes in tiered storage system 170 while a resume operation is performed on the corresponding virtual machine 120. As shown, VM1 state 225 is "transition" and front-end operation request 210 is "VM 1 resume." Based on VVOL life-cycle knowledge in combination with front-end operation request 210 "VM 1 resume," storage tiering module 150 generates operation tier hints 254 that cause storage system 170 to situate "VM1 suspend VVOL" at storage tier $180_1$ and both "VM1 disk 1 VVOL" and VM1 logs VVOL" at lower I/O performance storage tier $180_3$. These operation tiers hints 254 reflect a high level of provisioning activity—especially I/O activity—involving VVOLs 182 of type "suspend VVOL" during execution of front-end operations of type "VM resume."

Figure 3B:
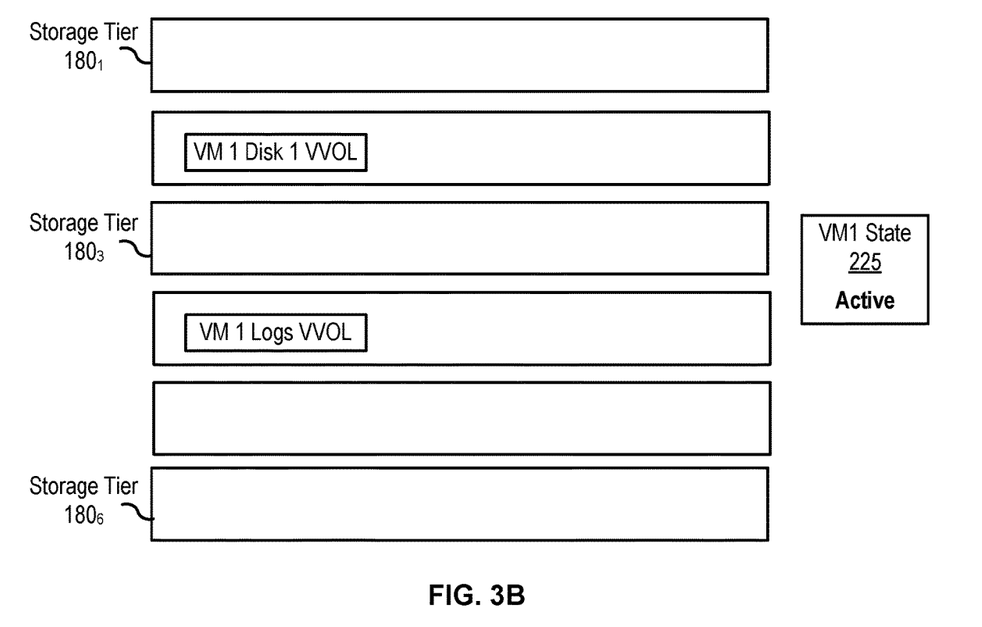
FIG. 3B is a conceptual diagram that illustrates where storage tiering module places virtual volumes in tiered storage system while the corresponding virtual machine is active.

FIG. 3B is a conceptual diagram that illustrates where storage tiering module 150 places virtual volumes 180 in tiered storage system 170 while the corresponding virtual machine 120 is active. As shown, storage tiering module 150 assigns "VM1 disk 1 VVOL" to storage tier $180_2$ and "VM1 log VVOL" to storage tier $180_4$. Although not shown in FIG. 3B, this placement reflects destination tier hints 256 based on destination profile 220. The sequence shown in FIG. 2B, FIG. 3A, and FIG. 3B illustrates how storage tiering module 150 satisfies user-specified requirements while optimizing storage placement of VVOLs 182 in storage tiers 180 based on the state of VM 120 and front-end operations 120 impacting VM 120.

Figure 4A:
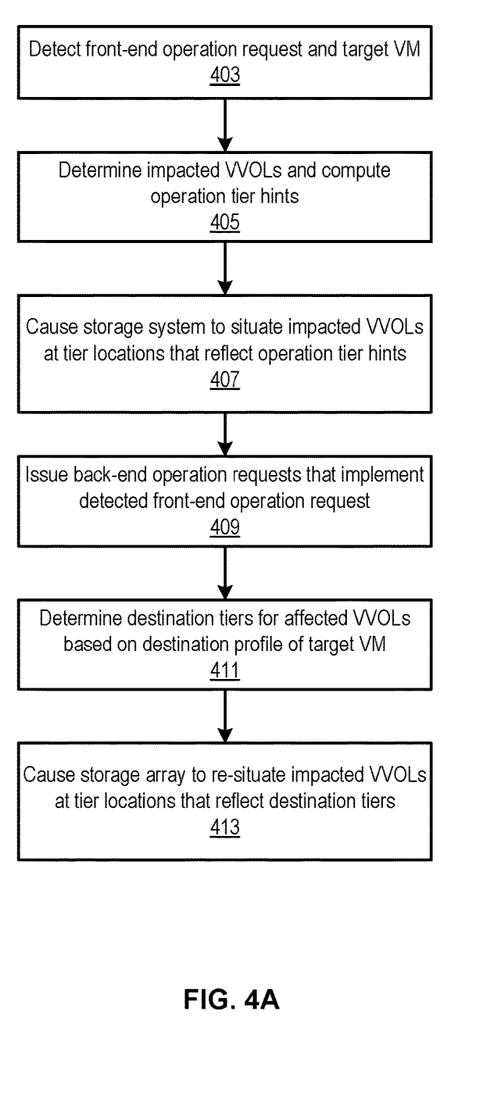
FIG. 4A depicts a flow diagram of method steps for moving virtual volumes between storage tiers to optimize front-end operations on virtual machines.

FIG. 4A depicts a flow diagram of method steps for moving virtual volumes between storage tiers to optimize front-end operations on virtual machines. Although this method is described in the context of a single set of operation tier hints 256, as virtual machine management center 130 implements different portions of a front-end operation, storage tiering module 150 may sequentially generate multiple sets of operating tier hints in a similar fashion.'

This method begins at step 403 where virtual machine management center 130 detects front-end operation request 210 and VM 120 that is targeted by front-end operation request 210. Virtual machine management center 130 may detect both explicit and implicit front-end operations requests 210 in any technically feasible fashion, such as observations and interactions with VMs 120. At step 405, storage tiering module 150 identifies VVOLs 182 associated with VM 120 for which storage tiering module 150 expects a change in provisioning activity level (e.g., amount of I/O operations) during execution of the front-end operation corresponding to front-end operation request 210. Such impacted VVOLs 182 may include VVOLs 182 that are dynamically created by virtual machine management center 130 as part of implementing the front-end operation. For instance, a front-end operation "VM suspend" may involve creating a VVOL 182 of type "VM suspend VVOL." For each impacted VVOL 182, storage tiering module 150 determines a corresponding operation tier hint 254 intended to guide optimal placement of VVOL 182 during the front-end operation. Storage tiering module 150 may be programmed with any type of heuristic that recommends placement of VVOLs 182 in storage tiers 180 based, at least partially, on the type of front-end operation and/or the type of VVOL 182.

At step 407, storage tiering module 150 causes storage system 170 to situate impacted VVOLs 182 in storage tiers 182 that reflect operation tier hints 254. Storage system 170 may accomplish step 407 in any technically feasible fashion that is consistent with the capabilities of storage system 170 and any available interfaces, such as storage API 160. One such technique is described in the method steps of FIG. 4B.

Virtual machine management center 130 then issues requests that implement the detected front-end operation request 210 (step 409). In particular, virtual machine management center 130 issues requests for back-end operations that provision the affected VVOLs 182, such as copying data. At step 411, for each impacted VVOL 182, storage tiering module 150 determines a corresponding destination tier hint 256 intended to guide optimal placement of VVOL 182 after the front-end operation. Storage tiering module 150 may be programmed with any type of heuristic that recommends final placement of VVOLs 182 in storage tiers 180. In some embodiments, storage tiering module 150 bases destination tier hints 256 on destination profile 220 corresponding to VVOL 120. In general, destination profile 220 captures user or administrator preferences for locations of VVOLs 120 based on VVOL type. At step 413, storage tiering module 150 causes storage system 170 to situate impacted VVOLs 182 in storage tiers 182 that reflect destination tier hints 256. In this fashion, storage tiering module 150 dynamically orchestrates optimized assignments of VVOLs 182 to storage tiers 180.

Figure 4B:
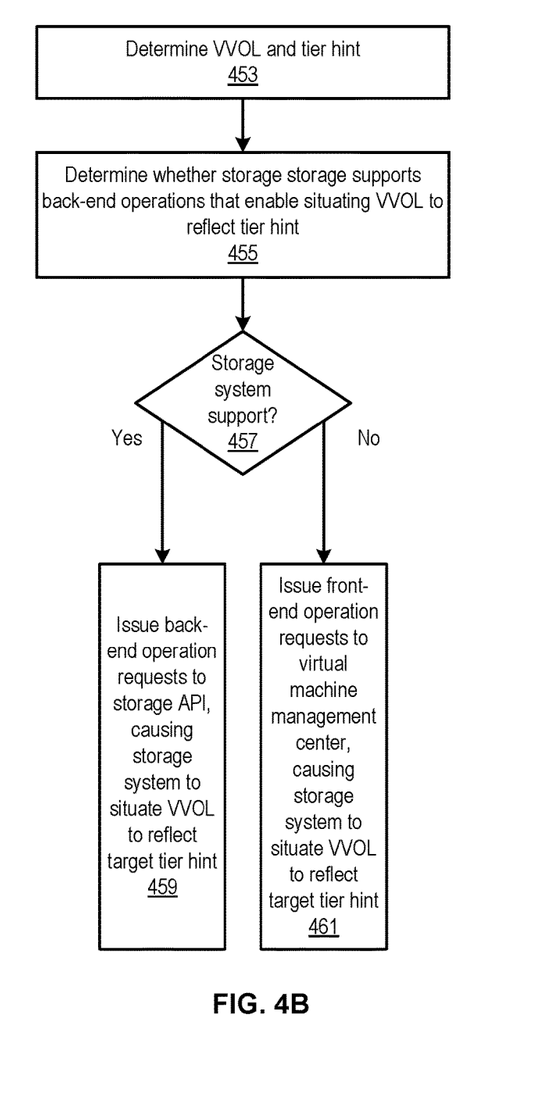
FIG. 4B depicts a flow diagram of method steps for moving virtual volumes from one storage tier to another storage tier.

FIG. 4B depicts a flow diagram of method steps for moving virtual volumes from one storage tier to another storage tier. Although this method is described in the context of assigning VVOLs 182 to storage tiers 180, similar method steps may be used to provide comprehensive tiering operations irrespective of whether storage systems supports back-end operation requests to copy virtual volumes between storage tiers.

This method begins at step 453 where storage tiering module 150 determines a recommendation (e.g., operation tier hint 254) for the location of VVOL 182 within storage tiers 180 of storage system 170. Such a recommendation may involve initial assignment of VVOL 182 to storage tier 180 or movement of VVOL 182 to storage tier 180. At step 455, storage tiering module 150 determines whether storage system 170 supports back-end operations that enable situating VVOL 182 to reflect the recommendation. Storage system 170 may either support such tiering operations directly or indirectly via storage API 160.

At step 457, if storage tiering module 150 detects that storage system 170 includes the required back-end operation support, then this method proceeds to step 459. At step 459, storage tiering module 150 leverages the back-end operation support and issues back-end operation requests that cause storage system 170 to consider the tier recommendation and situate VVOL 186 appropriately. Since storage tiering module 150 provides tier recommendations instead of requirements, storage system 170 may use knowledge of storage system 170, such as the remaining capacity at each storage tier 182, to fine-tune the tier recommendation before moving VVOL 182. In some embodiments, storage tiering module 150 conveys the back-end operation requests directly to storage system 170. In other embodiments, storage tiering module 150 conveys the back-end operations requests indirectly to storage system 170 via storage API 160.

If, at step 457, storage tiering module 150 detects that storage system 170 does not include the required back-end operation support, then this method proceeds to step 461. At step 461, storage tiering module 150 issues front-end operation requests that, when processed by virtual machine management center 130, create a new VVOL 182 at the recommended storage tier 180, copy the data in the original VVOL 182 to the new VVOL 182, and delete the original VVOL 182. The new VVOL 182 replaces the original VVOL 182 and, therefore, the data in original VVOL 182 is now situated in the recommended storage tier 180.

For illustrative purposes, the techniques described herein have been described in the context of virtual volumes as a "logical storage volume" and virtual machines as a "storage consumer". In alternate embodiments, these techniques may be applied in the generalized context of any storage volume that includes data associated with any storage consumer.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing data in a storage system that is configured to store data in a plurality of storage tiers, comprising:
   detecting a request to perform a front-end operation, wherein the front-end operation comprises provisioning operations of different types performed on a virtual machine;
   segregating the virtual machine data based on I/O requirements of the virtual machine;
   creating a set of virtual volumes associated with the virtual machine with a virtual volume type using the segregated virtual machine data;
   identifying a virtual volume from the set of created virtual volumes associated with the virtual machine that will be impacted during execution of the front-end operation, wherein the virtual volume is a logical aggregation of data associated with the virtual machine;
   identifying a front-end operation type included in the request;
   selecting a storage tier of the plurality of storage tiers for the virtual volume based on the identified front-end operation type and the virtual volume type, wherein the virtual volume type is based on a type of virtual machine data contained within the virtual volume;
   generating a virtual volume placement guidance based on the identified front-end operation;
   transmitting the virtual volume placement guidance and a set of commands to the storage system to instruct the storage system to place the virtual volume associated with the virtual machine in the selected storage tier;
   upon detecting that the virtual volume placement guidance contradicts with an auto-tiering mechanism provided by a storage array, disabling the auto-tiering mechanism;
   in response to receiving virtual volume placement guidance and the set of commands generating one or more back-end operations based at least in part on the virtual volume placement guidance and the set of commands; and
   performing one or more back-end operations to implement the front-end operation.

2. The method of claim 1, wherein selecting the storage tier comprises:
   estimating an input/output activity level during the front-end operation based on the operation type; and
   selecting the storage tier using the estimated input/output activity level.

3. The method of claim 1, further comprising:
   identifying a destination storage tier for the virtual volume to be moved after completion of the front-end operation based upon operation type of the front-end operation or a volume type of the virtual volume; and
   transmitting virtual volume placement guidance to the storage system to instruct the storage system to move the virtual volume from the selected storage tier to the destination storage tier.

4. The method of claim 1, wherein the virtual volume placement guidance is a recommendation and the storage system is able to deviate from the recommendation to optimize placement of the virtual volume within the plurality of storage tiers.

5. The method of claim 1, wherein the transmitted set of commands to perform one or more back-end operations to implement the operation include instructions to:
create a new virtual volume at the selected storage tier;
copy data included in the virtual volume to the new virtual volume;
delete the virtual volume; and
identify the new virtual volume as the virtual volume.

6. The method of claim 1, wherein the front-end operation is a cloning operation, the virtual volume represents a base disk, and selecting the storage tier comprises:
selecting the storage tier based upon a number of linked clones that are powered-on.

7. A non-transitory computer-readable medium storing instructions, which when executed by a processing device, cause the processing device to perform a method comprising: computer-implemented method, comprising:
detecting a request to perform a front-end operation, wherein the front-end operation comprises provisioning operations of different types performed on a virtual machine;
segregating the virtual machine data based on I/O requirements of the virtual machine;
creating a set of virtual volumes associated with the virtual machine with a virtual volume type using the segregated virtual machine data;
identifying a virtual volume from the set of created virtual volumes associated with the virtual machine that will be impacted during execution of the front-end operation, wherein the virtual volume virtual volume is a logical aggregation of data associated with the virtual machine;
identifying a front-end operation type included in the request;
generating a virtual volume placement guidance based on the identified front-end operation;
selecting a storage tier of the plurality of storage tiers for the virtual volume based on the identified front-end operation type and the virtual volume type, wherein the virtual volume type is based on a type of virtual machine data contained within the virtual volume;
transmitting virtual volume placement guidance and a set of commands to the storage system to instruct the storage system to place the virtual volume associated with the virtual machine in the selected storage tier;
upon detecting that the virtual volume placement guidance contradicts with an auto-tiering mechanism provided by a storage array, disabling the auto-tiering mechanism;
in response to receiving virtual volume placement guidance and the set of commands generating one or more back-end operations based at least in part on the virtual volume placement guidance and the set of commands; and
performing one or more back-end operations to implement the front-end operation.

8. The non-transitory computer-readable medium of claim 7, wherein selecting the storage tier comprises:
estimating an input/output activity level during the front-end operation based on the front-end operation type; and
selecting the storage tier using the estimated input/output activity level.

9. The non-transitory computer-readable medium of claim 7, the method further comprising:
identifying a destination storage tier for the virtual volume to be moved after completion of the front-end operation based upon operation type of the front-end operation or a volume type of the virtual volume; and
transmitting virtual volume placement guidance to the storage system to instruct the storage system to move the virtual volume from the selected storage tier to the destination storage tier.

10. The non-transitory computer-readable medium of claim 7, wherein the virtual volume placement guidance is a recommendation and the storage system is able to deviate from the recommendation to optimize placement of the virtual volume within the plurality of storage tiers.

11. The non-transitory computer-readable medium of claim 7, wherein the transmitted set of commands to perform one or more back-end operations to implement the operation include instructions to:
create a new virtual volume at the selected storage tier;
copy data included in the virtual volume to the new virtual volume;
delete the virtual volume; and
identify the new virtual volume as the virtual volume.

12. The non-transitory computer-readable medium of claim 7, wherein the front-end operation is a cloning operation, the virtual volume represents a base disk, and selecting the storage tier comprises:
selecting the storage tier based upon a number of linked clones that are powered-on.

13. An apparatus comprising:
a processing device; and
a memory coupled to the processing device, the memory storing instructions which, when executed by the processing device, cause the apparatus to:
detect a request to perform a front-end operation, wherein the front-end operation comprises provisioning operations of different types performed on a virtual machine;
segregate the virtual machine data based on I/O requirements of the virtual machine;
create a set of virtual volumes associated with the virtual machine with a virtual volume type using the segregated virtual machine data;
identify a virtual volume from the set of created virtual volumes associated with the virtual machine that will be impacted during execution of the front-end operation, wherein the virtual volume is a logical aggregation of data associated with the virtual machine;
identify a front-end operation type included in the request;
generate a virtual volume placement guidance based on the identified front-end operation;
select a storage tier of the plurality of storage tiers for the virtual volume based on the identified front-end operation type and the virtual volume type, wherein the virtual volume type is based on a type of virtual machine data contained within the virtual volume;
transmit virtual volume placement guidance and a set of commands to the storage system to instruct the storage system to place the virtual volume associated with the virtual machine in the selected storage tier;
upon detecting that the virtual volume placement guidance contradicts with an auto-tiering mechanism provided by a storage array, disabling the auto-tiering mechanism;

in response to the received virtual volume placement guidance and the set of commands generate one or more back-end operations based at least in part on the virtual volume placement guidance and the set of commands; and perform one or more back-end operations to implement the front-end operation.

14. The apparatus of claim 13, wherein selecting the storage tier comprises:

estimating an input/output activity level during the front-end operation based on the operation type; and selecting the storage tier using the estimated input/output activity level.

15. The apparatus of claim 13, wherein the instructions further cause the apparatus to:

identify a destination storage tier for the virtual volume to be moved after completion of the front-end operation based upon operation type of the front-end operation or a volume type of the virtual volume; and transmit virtual volume placement guidance to the storage system to instruct the storage system to move the virtual volume from the selected storage tier to the destination storage tier.

16. The apparatus of claim 13, wherein the virtual volume placement guidance is a recommendation and the storage system is able to deviate from the recommendation to optimize placement of the virtual volume within the plurality of storage tiers.

17. The apparatus of claim 13, wherein the transmitted set of commands to perform one or more back-end operations to implement the front-end operation include instructions to:

create a new virtual volume at the selected storage tier;

copy data included in the virtual volume to the new virtual volume;

delete the virtual volume; and identify the new virtual volume as the virtual volume.

* * * * *